March 22, 1938.  A. LUTSCHG  2,112,107
AEROPLANE
Filed Aug. 20, 1936
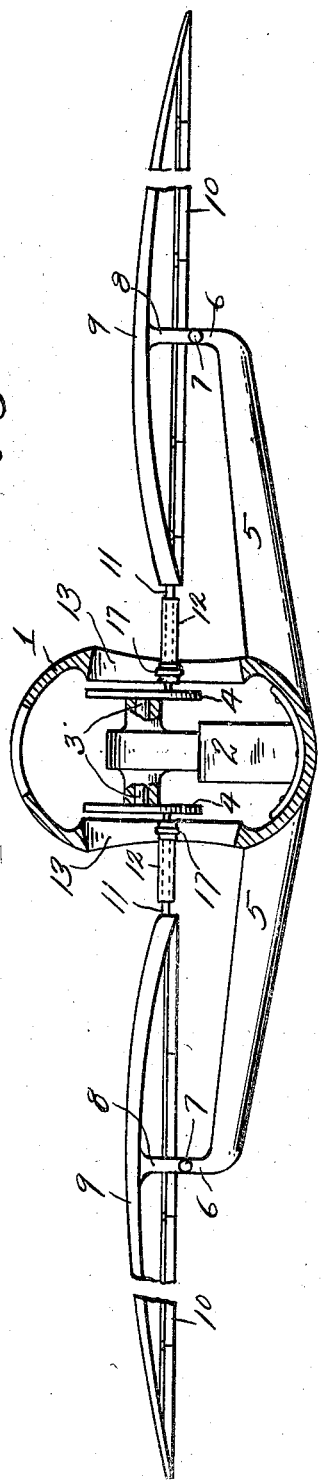
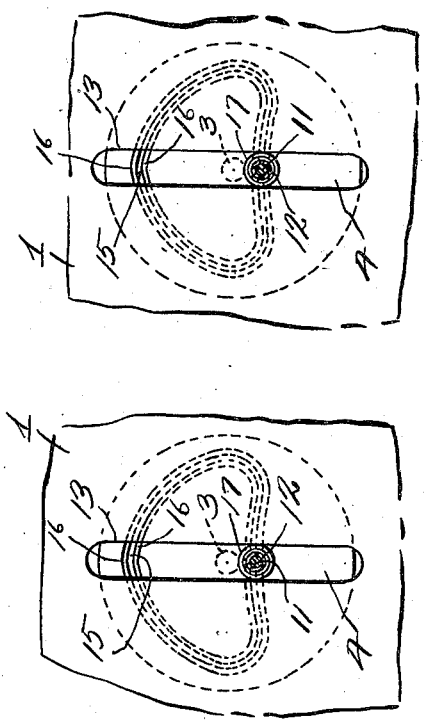
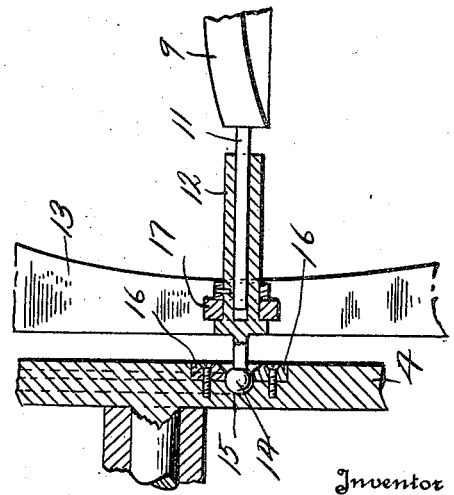
Inventor
Arnold Lutschg
By Philip A. H. Terrell
Attorney Patented Mar. 22, 1938

2,112,107

UNITED STATES PATENT OFFICE 2,112,107

AEROPLANE

Arnold Lutschg, Great Bend, Kans.

Application August 20, 1936, Serial No. 97,065

1 Claim. (Cl. 244—22)

The invention relates to aircraft, and has for its object to provide a device of this character wherein wings are rockably mounted and are rocked by rotatable members having cam slots therein cooperating with the inner ends of the hinged wings whereby when the cam members are rotated the wings will be rocked for simulating the flying action of a bird while in flight.

A further object is to provide the inner ends of the hinged wings with a headed member disposed within the cam slots and movable therethrough but held against outward movement and a telescopic connection between the headed members and the inner ends of the wings.

A further object is to provide the connections between the cam slot wheels and the inner ends of the wings with bearing rollers movable over vertical bearing surfaces in the sides of the fuselage, thereby preventing side twisting on the hinged mounting of the wings and positive vertical guiding of the inner ends of the wings, as they are raised or lowered by the headed member passing through the cam slots.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a vertical transverse sectional view through the aeroplane.

Figure 2 is an enlarged vertical transverse sectional view through a portion of one of the cam wheels and telescopic connection to one of the wings.

Figure 3 is a fragmentary side elevation of a portion of the fuselage, showing the cam slot wheel and vertical bearing raceway.

Figure 4 is a view similar to Figure 3, but showing the opposite side of the fuselage.

Referring to the drawing, the numeral 1 designates the elongated fuselage, which may be of any construction. Disposed within the fuselage 1 is an engine 2, which may be of any construction, however said engine is provided with a drive shaft 3, which extends transversely of the fuselage and is provided with cam slot wheels 4.

Extending outwardly and upwardly from opposite sides of the fuselage 1 are wing supporting arms 5, the outer ends of which terminate in perches 6, to the upper ends of which are hingedly connected at 7 downwardly extending arms 8 carried by the under sides of the rockable wings 9, which are adapted to be rocked in a vertical plane for simulating the wing movement of a bird in flight. Wings 9 may be provided with conventional forms of ailerons 10, operable in the usual manner. It is to be understood that the fuselage may be provided with the usual conventional structure of searchlight and stabilizer, and applicant does not limit himself in this particular.

The inner ends of the rockable wings 9 are provided with shafts 11, which are slidably mounted in the sleeves 12, which extend through the vertical bearing raceways 13 in the sides of the fuselage and terminate in balls 14 disposed within the cam slots 15 of the cam slot wheels 4. The balls 14 are held in position by removable retaining members 16, which allow the balls to move through the cam slots 15 during the rotation of the cam wheel 4 and the sleeve 12 and shaft 11 to assume positions other than parallel to the axis of the cam wheels 4 as they rotate, thereby allowing an up and down movement of the inner ends of the wings 9, and which up and down movement may be varied according to the shape of the cam slots 15, which are preferably similar in both cam wheels 4. It will be noted that there is a telescopic connection between the cam wheels and the inner ends of the wings, thereby allowing a lengthening and shortening connection, as it is obvious that different portions of the cam slots will be at different distances from the hinging points 7.

The inner ends of the rockable wings 9 are guided in their upward and downward movement and are held against transverse movement incident to the rotation of the cam wheels by bearing wheels 17 rotatably mounted on the sleeves 12 and within the raceways 13, hence it will be seen that there is a positive guiding of the inner ends of the wings. It is obvious that various movements of the wings may be obtained by varying the shape of the cam slots, and that applicant shows a cam slot shape that gives a sudden upward movement of the outer ends of the wings 9 and a flapping operation with a pause on the flat side of the cam slot.

From the above it will be seen that an aeroplane is provided of the flapping wing type, which is positive in its operation and the wings flap by a cam slot movement so that the wings will simulate the flying operation of a bird.

The invention having been set forth what is claimed as new and useful is:

The combination with an aeroplane body, wing supporting arms extending outwardly from opposite sides of said body, wings pivotally mounted on said arms intermediate the ends of said wings and rockable in a vertical transverse plane in relation to the body, of means for rocking said wings in said plane, said means comprising rotatable cam discs within the body and having cam slots therein, telescopic connections between the inner ends of the wings and the cam slots of the discs, vertically disposed straight bearing raceways in the opposite sides of the body and through which the telescopic connections extend and antifrictional bearing members carried by the telescopic connections and disposed in the raceways and vertically guided therein in said vertical transverse plane.

ARNOLD LUTSCHG.